(12) United States Patent
Bryant

(10) Patent No.: US 10,186,160 B2
(45) Date of Patent: Jan. 22, 2019

(54) APPARATUS AND METHOD FOR AIDING LEARNING

(71) Applicant: Jacklyn Bryant, Harpenden (GB)

(72) Inventor: Jacklyn Bryant, Harpenden (GB)

( * ) Notice: Subject to any disclaimer, the term of this patent is extended or adjusted under 35 U.S.C. 154(b) by 832 days.

(21) Appl. No.: 14/390,694

(22) PCT Filed: Mar. 15, 2013

(86) PCT No.: PCT/GB2013/050670
§ 371 (c)(1),
(2) Date: Oct. 3, 2014

(87) PCT Pub. No.: WO2013/150266
PCT Pub. Date: Oct. 10, 2013

(65) Prior Publication Data
US 2015/0099247 A1    Apr. 9, 2015

(30) Foreign Application Priority Data

Apr. 5, 2012    (GB) .................... 1206121.4

(51) Int. Cl.
*G09B 5/02*     (2006.01)
*G09B 11/00*    (2006.01)
(Continued)

(52) U.S. Cl.
CPC ............ *G09B 5/02* (2013.01); *G09B 11/00* (2013.01); *G09B 11/02* (2013.01); *G09B 11/04* (2013.01);
(Continued)

(58) Field of Classification Search
CPC ........ G09B 23/28; G09B 11/02; G09B 13/00; G09B 19/04; G09B 19/06; G09B 5/02
See application file for complete search history.

(56) References Cited

U.S. PATENT DOCUMENTS

| 1,906,539 A | 5/1933 | Church |
| 3,971,140 A | 7/1976 | Martinez |

(Continued)

FOREIGN PATENT DOCUMENTS

| BE | 643 744 A | 5/1964 |
| CN | 201570136 U | 9/2010 |

(Continued)

OTHER PUBLICATIONS

Iriki, A., & Sakura, O. (2008). The neuroscience of primate intellectual evolution: natural selection and passive and intentional niche construction. Philosophical Transactions of the Royal Society B: Biological Sciences, 363(1500), 2229-2241. http://doi.org/10.1098/rstb.2008.2274.*

(Continued)

*Primary Examiner* — Jerry-Daryl Fletcher
(74) *Attorney, Agent, or Firm* — Fay Sharpe LLP

(57) ABSTRACT

Apparatus for aiding learning by a person comprises a cover or shield (1) for concealing from the person a part of the person's body, and a webcam (6) and a screen (10) for visually displaying to the person, during concealment of the concealed body part, images of a part of the person's body not in direct view of the person. The apparatus may be used in the learning of a skill, such as hand-writing. In another embodiment, the shield is a collar worn to conceal part of the wearer's body, and the webcam and screen display the concealed body part in real time to the wearer. This apparatus can be used in many applications, such as to learn sports activities or to correct body image, posture or movement.

11 Claims, 7 Drawing Sheets

(51) Int. Cl.

| | | |
|---|---|---|
| *G09B 11/02* | (2006.01) | |
| *G09B 13/00* | (2006.01) | |
| *G09B 13/04* | (2006.01) | |
| *G09B 15/08* | (2006.01) | |
| *G09B 23/28* | (2006.01) | |
| *G09B 11/04* | (2006.01) | |
| *G09B 17/00* | (2006.01) | |
| *G09B 19/04* | (2006.01) | |
| *G09B 19/06* | (2006.01) | |

(52) U.S. Cl.
CPC ............. *G09B 13/00* (2013.01); *G09B 13/04* (2013.01); *G09B 15/08* (2013.01); *G09B 17/00* (2013.01); *G09B 19/04* (2013.01); *G09B 19/06* (2013.01); *G09B 23/28* (2013.01); *G09B 23/285* (2013.01)

(56) References Cited

U.S. PATENT DOCUMENTS

| | | | |
|---|---|---|---|
| 4,371,893 | A | 2/1983 | Rabeisen |
| 4,419,921 | A | 12/1983 | Simanski |
| 4,679,482 | A | 7/1987 | Simanski |
| 5,419,704 | A | 5/1995 | North |
| 5,722,836 | A | 3/1998 | Younker |
| 6,659,776 | B1 | 12/2003 | Aumann et al. |
| 2001/0029829 | A1 | 10/2001 | Moe |
| 2004/0033476 | A1 | 2/2004 | Shun |
| 2004/0046744 | A1 | 3/2004 | Rafii et al. |
| 2005/0064378 | A1 | 3/2005 | Toly |
| 2005/0150362 | A1 | 7/2005 | Uehara |
| 2006/0107816 | A1 | 5/2006 | Vinoly |
| 2006/0225560 | A1 | 10/2006 | Sherman |
| 2007/0032143 | A1 | 2/2007 | Short |
| 2007/0166682 | A1 | 7/2007 | Yarin et al. |
| 2011/0277701 | A1 | 11/2011 | King |
| 2012/0308977 | A1 | 12/2012 | Tortola |

FOREIGN PATENT DOCUMENTS

| | | |
|---|---|---|
| CN | 102013190 A | 4/2011 |
| CN | 20203575 U | 10/2011 |
| DE | 197 22 929 C1 | 1/1999 |
| FR | 1.460.463 A | 11/1965 |
| FR | 2 503 429 A1 | 10/1982 |
| GB | 2 367 180 A | 3/2002 |
| GB | 2 384 106 A | 7/2003 |
| GB | 2 445 971 A | 7/2008 |
| JP | 11-296065 | 4/1998 |
| JP | 2000-24161 A | 9/2000 |
| JP | 2001-109367 A | 4/2001 |
| JP | 2006-163269 | 6/2006 |
| JP | 2009-100908 A | 5/2009 |
| JP | 2011-70139 | 4/2011 |
| JP | 2011-28196 A5 | 8/2012 |
| WO | WO 2006/088251 A1 | 8/2006 |
| WO | WO 2010/148078 A2 | 12/2010 |

OTHER PUBLICATIONS

Iriki A, Tanaka M, Obayashi S, Iwamura Y. Self-images in the video monitor coded by monkey intraparietal neurons. Neurosci. Res. 2001;40:163-173. doi:10.1016/50168-0102(01)00225-5.*
PCT/GB2013/050670, "Search Report of the International Searching Authority".
GB 1304802.0, "Patents Act 1977: Search Report Under Section 17".
Bertamini, et al., "The Rubber Hand Illusion in a Mirror", *Consciousness and Cognition*, Elsevier Inc., Amsterdam, NL, V. 20, No. 4, Apr. 14, 2011, pp. 1108-1119.
Smith, et al., The Effect of Delayed and Displaced Visual Feedback on Motor Control, *Journal of Motor Behavior*, V. 12, No. 2, 1980, pp. 91-101.
Morikiyo, et al., Effects of Delayed Visual Feedback on Motor Control Performance, *Perceptual and Motor Skills*, No. 70, 1990, pp. 111-114.
Newport, et al., "Fake Hands in Action: Embodiment and Control of Supernumeracy Limbs", Experimental Brain Research, Springer, V. 204(3), Jul. 2010, pp. 385-395.
Fotopoulou, et al. Mirror-view reverses Somatopaphrenia: Dissociation between First- and Third-person Perspectives on Body Ownership, *Neuropsychologia*, V. 49, 2011, pp. 3946-4955.
Regenbrecht, et al., "Beyond the Looking Glass: Fooling the Brain with the Augmented Mirror Box", *Presence*, Massachusetts Institute of Technology, V. 20, No. 6, Dec. 2011, pp. 559-576.
EP 13 711 736.2 European Examination Report dated Dec. 22, 2016.
Anonymous, "UFO Cap is a Wearable Umbrella Alternative", CraziestGadgets.com, posted by Jeff in Clothing Gadgets, Jan. 8, 2009 (Jan. 8, 2009), retrieved from the internet: http://web.archive.org/web/20090108153949/http://craziestgadgets.com/2008/10/07/ufo-cap-is-a-wearable-umbrella-alternative.
GB 1412912.6, "Patents Act 1977: Combined Search and Examination Report Under Sections 17 18(3)".
JP 2015-503939 Japanese Office Action dated Jan. 24, 2017.
The Royal Society Publishing, "Philospical Transactions B", PubMed Central, Figure 1: Philos Trans R Soc Lond B Biol Sci. Jun. 27, 2008; 363, https://www.ncbi.nlm.nih.gov/pmc/articles/PMC2394573/figure/fig1/, printed Feb. 1, 2018.
Newman, https://web.archive.org/20090325221943:http:www.commediamask.com:80/index.html "Performance quality leather commedia and neutral masks", Mar. 25, 2009 (retrieved on Mar. 26, 2018).
EP Application No. 13 711 736.2 Examination Report dated Apr. 10, 2018.

* cited by examiner

APPARATUS AND METHOD FOR AIDING LEARNING

The present invention relates to an apparatus and method for aiding learning and in particular, though not exclusively, the learning of a skill, such as handwriting, touch-typing, playing a musical keyboard, learning a foreign language, or performing sports activities including golf, yoga, pilates, etc.

The process of learning a skill of any kind involves the repetition of complex activities to enable the required activities to be learnt and stored in the student's brain. The brain is also constantly predicting what is most likely to happen next, and subsequently setting in motion perceptions, behaviours, movements, etc. best adapted to what is expected, before events occur. The prediction takes place non-consciously ahead of the activity taking place.

When complex skills are being learnt, it is very typical for some aspect of the repetition of the components of the skill to be learnt incorrectly and subsequent predictions then also occur incorrectly. When predictions happen incorrectly, mistakes are made and a 'fail' takes place. A wrong prediction is by its nature very difficult to correct, because it happens before one has consciously thought about it.

It is therefore beneficial if skill components are either learnt properly from the beginning, or wrong skill components are isolated and learnt correctly. Once achieved, the predictions will then naturally happen correctly.

This can be achieved if complex skills with many components are broken down, so that each component can be focused upon and learnt, understood and felt more simply on its own whilst still being a part of the overall skill that is to be learnt. Once each component has been perfectly learnt, at the unique ability level of the student, it can be integrated back into the complete skill until the whole skill is being accomplished perfectly and automatically.

Various traditional teaching methods, such as for the learning of touch-typing, involve concealment of part of the person's body, such as their hands. However, these and other known teaching methods have struggled to break skills into suitable components and then re-integrate the components to form the whole, whilst maintaining the learning of the skill of the overall activity.

It is an object of the present invention to provide an apparatus and method for facilitating the separation of activities of a particular skill so that they can be learnt by repetition individually, but also simultaneously with the overall skill being learnt, and the learnt repetition can then become a prediction stored in the non-conscious memory of the student.

It is another object to provide an apparatus and method for aiding in learning other applications, such as learning to correct body image perception or body posture.

According to one aspect of the present invention there is provided apparatus for aiding learning by a person, said apparatus comprising means for concealing from the person a part of the person's body, and being characterised by the provision of means for visually displaying to the person during concealment of the concealed body part one or more images of a part of the person's body not in direct view of the person.

Preferably, the display means includes a camera operatively connected to a display screen, and the concealing means is arranged to enable the camera to capture images of the concealed body part and relay the images to the display screen to be viewed by the person.

In one example, the apparatus is intended to aid a student in the learning of a skill, the concealing means is arranged to conceal at least the parts of the student's body used to perform the skill, and the visual display means is arranged to display images of the concealed parts in real time during performance of the skill by the student. The apparatus may also include means for monitoring accuracy of the performance and for transmitting, verbally or otherwise, evaluative information relating to the accuracy to the student. The information may be transmitted to the student in real time during the performance.

The performance of the skill may involve use of an implement by the student, the concealing means being arranged also to conceal the implement during its use, and the visual display means being arranged also to display images of said implement in real time during said performance.

The apparatus may be suitable for use in learning a manual activity or skill, such as handwriting or using a typing or musical keyboard, and the concealing means may comprise a cover, such as a box-shaped structure, dimensioned to accommodate at least one hand of the student and the implement used to perform the skill, such as a writing implement or a keyboard, the cover being configured to prevent the student from directly viewing the hand(s) and the implement, whilst enabling the camera to capture images of the concealed at least one hand and implement. Preferably the apparatus includes means for mounting the camera on the cover, so that the camera can capture images from within the cover. The cover may have a sloping surface and support means to enable it to be positioned over a keyboard to conceal the keyboard and both hands of the student.

The implement may include a board having a writing surface upon which the student can write whilst the student's hand is concealed by the cover. The writing surface may be capable of being wiped clean for re-use.

In another embodiment, the concealing means may comprise a shield arranged to be positioned around the neck area of the person to conceal from direct view of the person the part of the person's body below the shield.

In yet another embodiment, the skill involves learning speech such as a foreign language, the concealing means is arranged to conceal at least the student's mouth, and the visual display means is arranged to display images of the concealed mouth in real time to the student during performance of the skill by the student.

According to another aspect of the present invention, there is provided a method of use of the apparatus according to the first aspect, comprising the steps of concealing by the concealing means the body part of the person; and displaying to the person by the visual display means one or more images of a body part not in direct view of the person.

According to a further aspect of the invention, there is provided a method of aiding learning by a person comprising the steps of concealing from the person a part of the person's body; capturing one or more images of a part of the person's body not in direct view of the person; and displaying said captured images to the person.

The captured images are preferably displayed in real time to the person.

In one example, the concealing means conceals at least the body part used to perform a skill to be learnt as well as an implement if used to perform the skill, and the visual display means displays images in real time of the concealed body part, and implement if used, during said performance.

The method may further include the step of monitoring accuracy of the performance and transmitting evaluative information, preferably verbally and/or in real time, relating to the accuracy to the student.

"In real time" is intended to mean either simultaneously or with a minimum time delay as required. When using the camera and screen, although the activity is displayed on the screen effectively in real time, there will be a minute or very short delay caused by the electronic processing of the images through the camera to the screen.

According to another aspect of the invention, there is provided a method of learning core literacy skills, in particular handwriting and reading skills involving shape and formation of characters of a language, comprising the steps of: (i) tracing a symbol not indicative of a language character in a continuous and repetitious manner until a desired level of accuracy and speed of the tracing is attained; (ii) carrying out the tracing in step (i) whilst simultaneously performing a different action until a desired level of accuracy and speed of the simultaneous performance of the tracing and the different action is attained; (iii) carrying out a first sequence consisting of tracing a language character followed by a pause and repeating the first sequence until a desired level of accuracy and speed of tracing the language character is attained; (iv) carrying out a second sequence consisting of tracing of the symbol followed continuously by the first sequence, the tracing of the language character overlaying the tracing of the symbol, and repeating said second sequence until a desired level of accuracy and speed of said second sequence is attained; (v) carrying out a third sequence consisting of the second sequence without a pause followed continuously by tracing the symbol, and repeating the third sequence until a desired level of accuracy and speed of the third sequence is attained; (vi) carrying out the third sequence whilst simultaneously performing a different action until a desired level of accuracy and speed of the simultaneous performance of the third sequence and the different action is attained; (vii) carrying out the third sequence whilst simultaneously performing co-ordinated verbal announcement of and hand positioning for the start of the language character of the sequence and repeating the simultaneous performance of the third sequence and co-ordinated verbal announcement and hand positioning until a desired level of accuracy and speed of the simultaneous performance is attained; (viii) writing, without tracing, the language character overlaying the symbol and repeating steps (v), (vi) and (vii) using the writing without tracing until a desired level of accuracy and speed of writing is attained; and (ix) writing, without tracing, the language character within predetermined substantially parallel guide lines.

The different action may include verbally announcing the name and/or sound of the language character. The method may include repeating steps (iii) to (ix) using at least one different language character. The method may include repeating steps (iii) to (ix) using a combination of the different language characters. The method may include verbally announcing a word formed by the combination of different language characters. The method may include a further step of carrying out the first sequence whilst simultaneously performing a different action until a desired level of accuracy and speed of the simultaneous performance of the first sequence and the different action is attained; said further step being carried out between steps (iii) and (iv). The method may include a further step of carrying out the second sequence whilst simultaneously performing a different action until a desired level of accuracy and speed of the simultaneous performance of the first sequence and the different action is attained, said further step being carried out between the steps (iv) and (v). The symbol and the or each language character may be traced in a size larger than conventional sizes thereof used in handwriting.

The invention will now be further described by way of examples only with reference to the accompanying drawings, in which:—

Figure 1:
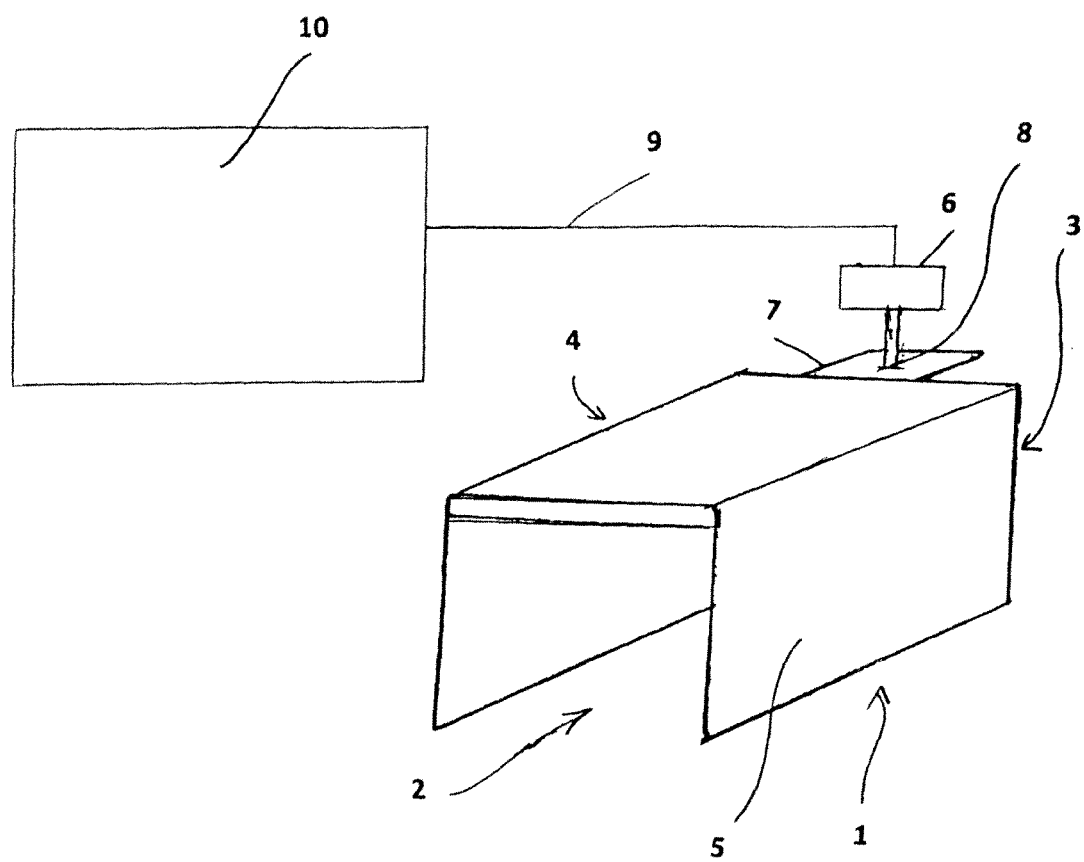
FIG. 1 shows a perspective view of a first embodiment of the invention intended to be used to aid the learning of hand-writing.

Referring firstly to FIG. 1, there is shown apparatus for aiding the learning by a student of a manual activity or skill, in particular hand-writing. The apparatus includes a cover or shield 1 which is preferably box-shaped and open at least at one end 2 for insertion of the student's hand. The cover 1 may also be designed to provide sufficient space to conceal from the student's direct view the student's wrist and possibly also his arm, as well as the hand. The cover 1 is also designed to conceal from the student's direct view writing implements, such as a pen or pencil (not shown) and an object (also not shown) to be written on. This object may be paper, or alternatively a wipe board which can be written on and then wiped clean for re-use. The cover 1 may be open at opposite end faces 2, 3 to enable use by both left and right-handed students, whilst being closed on both side faces 4, 5 to prevent the student from directly viewing the concealed hand. A video camera or webcam 6, preferably of a USB type, is mounted on the cover 1 on a camera mount 7. One or more camera mount holes 8 are provided to enable the mounted camera 6 to be angled so that the camera can capture images from within the cover 1 at an angle that shows the student's concealed fingers, as well as the point or nib of the writing implement and the paper or board being written on. The camera could alternatively be mounted within the cover.

The camera 6 is connected, preferably by a USB cable 9, to a personal computer screen 10, or some other visual display means. The screen 10 is positioned to be within the direct view of the student.

The personal computer 10 is configured to record, display and replay the images taken by the camera 6 from within the cover 1, as the student writes.

By use of verbal coaching activated, for example, by the hand movement, the computer software may be able to monitor accuracy of letter formation, speed of writing, flow, etc. The coaching reinforces the knowledge that the style or neatness of writing is not the most important aspect of this exercise. It is all to do with how it feels for the brain to directly control the hand when writing; that slowing the writing down, gives the brain time to control the hand; and that the student's eyes do not need to directly see the hand. Writing whilst using the apparatus is intended to be more complex so that the student's ability to write will be reduced, and then when they return to writing normally (with hand seen), writing will be easier than it was before.

The computer may provide on screen template paper for use with the camera, including for example a pen placement indicator and ruled lines or lines with shading. It may also include instructions to use the other hand to push the paper up after a line has been written on, once a point on the line has been reached.

The size of the visual feedback on the screen should preferably be life-size, or smaller. A smaller screen forces the student to concentrate on the small image and focus more on the task.

The display and feedback on the screen in real time can include a time delay. However any such delay in the visual feedback on the screen makes the activity harder to undertake. Minimal or no time delay is preferred for optimal effectiveness.

The student writes a sample of text; either copied or made up, or alternatively a co-ordinated up/down movement or pattern with a pencil or pen, and watches the activity on the screen whilst being unable to directly see their hand.

Student's writing posture would be naturally correct whilst using the apparatus, because it is too difficult to use the apparatus without sitting properly. The student's head is upright so that the student can see the screen, thereby preventing the student from slouching or leaning on to the table with their head on one side when writing. The cover/video camera position is such that the arm has to be extended in front of the student as per a 'proper' posture required for writing.

If the student's natural pen/pencil grip is incorrect, it would be corrected whilst using the apparatus, because an incorrect grip will result in the student not being able to see the point or nib of the pen/pencil on the screen and the student can only carry out the activity properly when the point or nib can be seen. Once the student has focussed on the feeling of a correct grip, this can be repeated without the apparatus.

The provision of a disconnected real-time image of hand movement on the screen ensures the student can focus more on the feel of the brain/hand co-ordination whilst the eyes watch the screen. It proves to the student that they can think of a letter, recall its shape and write it, without their eyes seeing their hand and without their eyes 'causing' the movements involved.

By illustrating the movement in real-time on the screen, the student's learning ability is strengthened. They can feel, as well as see on screen, their hand moving but the two are disconnected or separated, and therefore the visual processing does not override the movement processing. In using the apparatus, the fine motor movement aspect of writing is highlighted. The apparatus enables the student to "see" their hand writing but with their hand being detached from their self. As the student's confidence in their "hand's" ability to write increases, so the visual need or desire to watch their hand decreases.

This enables the development of automaticity of handwriting. When the student resumes normal writing, i.e. being able to see their hand, the conscious awareness of the hand/brain movement for writing can still be felt, thought and noticed. The product forces the student to write in a more complex setting; the actual movements required remain unchanged, but carrying out the task is more difficult. The success of this apparatus is realized after having used it; writing is easier, posture is easier to correct as the student wrote with the correct posture, pen grip is easier to correct as the student has written with a proper pen grip. The apparatus forces the specific hand/brain co-ordination aspect of learning handwriting skills to be felt, and once the student has experienced these movements and knows what they feel like, then they can repeat them without the apparatus.

Figure 2:
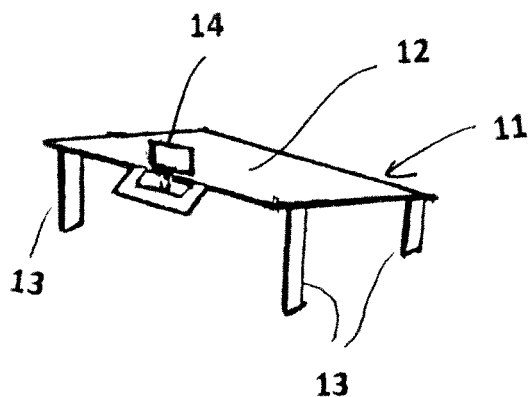
FIGS. 2 to 4 show perspective views of a second embodiment intended to be used as an aid to learning touch-typing.

The second embodiment shown in FIG. 2 is similar to the apparatus of FIG. 1 with modifications to enable it to accommodate a computer keyboard to learn the skill of touch-typing.

Figure 3:
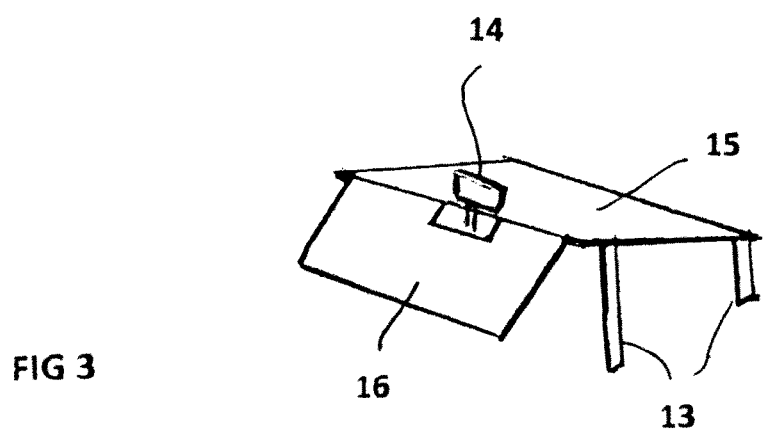
Figure 4:
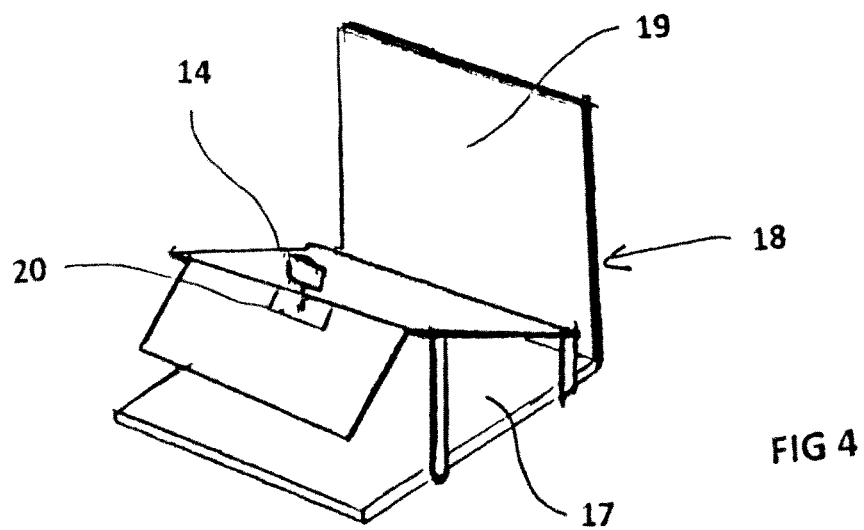

FIG. 2 illustrates a camera mount 11 which has an upper surface 12, preferably angled or sloping, supported by a plurality of legs 13. A USB video camera 14 for capturing images from beneath the upper surface 12 is attached to the mount 11. In FIG. 3, a cover or shield 15 is placed over the camera mount 11 and is formed with a flap 16 to conceal the space beneath the mount from direct view of a student. The mount and cover are then positioned over a keyboard 17 of a laptop or other personal computer 18, as shown in FIG. 4, so that a screen 19 of the computer can be seen by a student using the keyboard 17, whilst the student's hand(s) and the keyboard are concealed from direct view of the student by the cover 15. The camera 14 preferably has a wide angle lens and is positioned over a central aperture 20 in the cover to enable an image of the whole keyboard to be captured. The captured images can then be relayed to the computer screen 19 for visual display to the student. The camera may alternatively be mounted beneath the cover.

In this embodiment, the use of verbal coaching from the computer is activated by typing. The coaching reinforces the need to slow down, feel the fingers moving, enjoy getting to know where the fingers need to be by movement and not by sight.

As in the first embodiment, the size of the visual feedback on the screen should preferably be life size, or smaller.

The display on the computer screen can be split in half horizontally, one half showing visual relay of hands, and the other half showing touch typing software being used to learn to touch type. The user can position either product in either half as per their preference. The display is preferably real time, as a time delay in the visual feedback will make this activity very hard and will affect its effectiveness.

Current methods for learning how to touch type rely on software programmes or games enabling the student to repetitively practice typing letters. Keyboard letters are often hidden to ensure the student remembers the positions of the keys without the visual prompt.

The use of the correct finger for the correct key is checked by the teacher. However, in a classroom situation with many students learning, the use of incorrect fingers is an error which even the most vigilant teacher will often not be in a position to see.

The method described here ensures that the correct finger has typed the correct key, and assists in the student learning to type by movement memory and not by sight.

One method of use of the apparatus is as follows:—

Step 1

The student types with their hands exposed, but with the camera mount 11 over their hands to enable videoing of the movement. The screen shows only the touch typing software that is being used. The product software uses finger recognition software with a webcam to monitor finger movement and checks that the correct finger is used to type the key specified. The typed key is only 'correct' when the correct finger and key are used.

Step 2

The student's hands are still exposed, but in addition to the computer accuracy check, the screen is now split in half horizontally—one half shows visual relay of hands, other half shows touch typing software being used to learn to touch type. The student can position either product in either half as per their preference.

The speed at which the user moves from step 1 to step 2 depends on their ability to cope with the information being displayed.

Step 2 is complete only when the student can locate each of the keys, and position their hands in the proper starting position (i.e. with index fingers on the f and j keys with the other fingers placed on the adjacent keys).

Once the student is fairly competent in using the keyboard, they can proceed to Step 3.

Step 3

The cover 15 is used so that the hands are concealed from direct view of the student. The screen display is as per Step 2.

Figure 5:
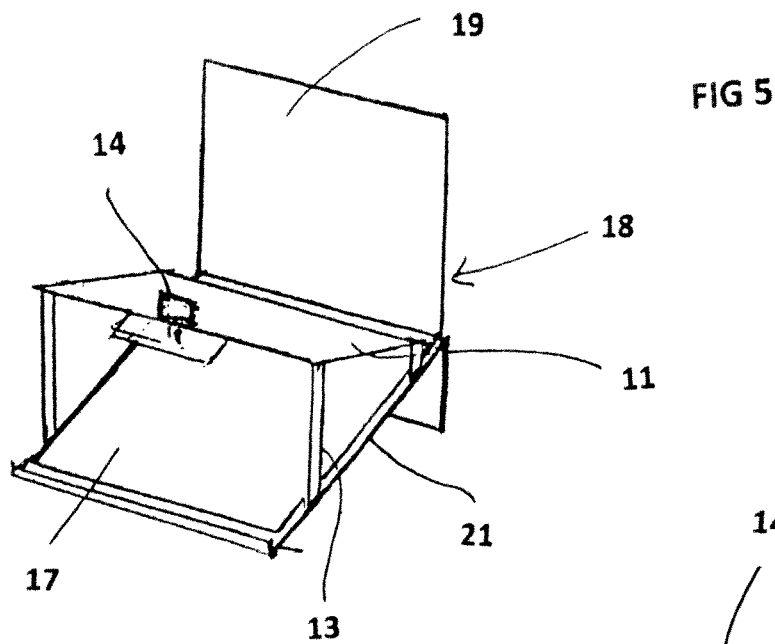
FIGS. 5 to 7 show side and perspective views of another embodiment also intended to be used in the learning of touch-typing.
Figure 6:
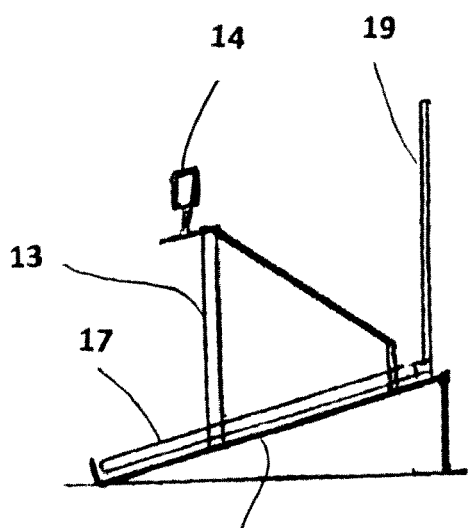
Figure 7:
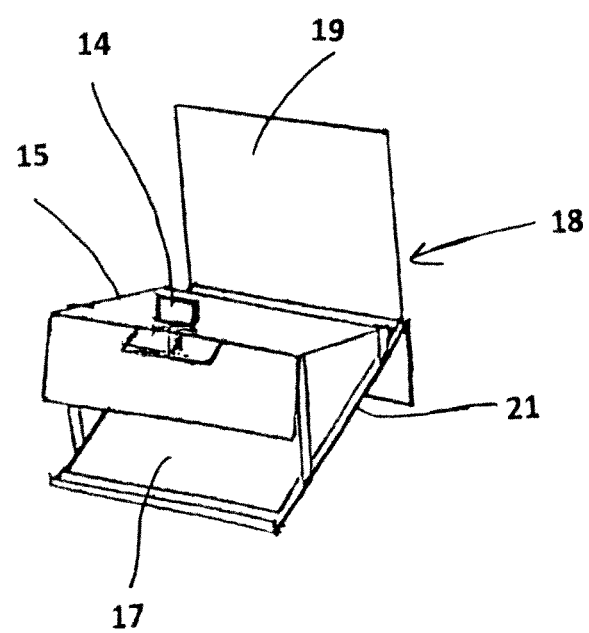
Figure 8:
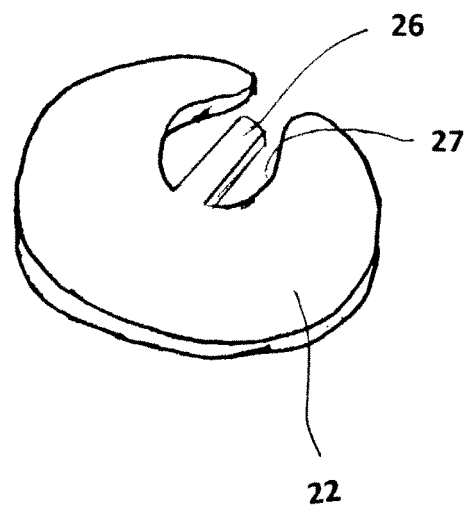
FIGS. 8 to 11 show views of yet another embodiment of the invention, which may be used to learn a sport or other movement skills or other learning applications.

The modified embodiment shown in FIGS. 5 to 7 illustrate how the apparatus in FIGS. 2 to 4 can be used with a keyboard tilt board 21. When the laptop is placed on the tilt board 21, the keyboard is angled towards the student to facilitate the typing.

The embodiment shown in FIGS. 8 to 11 is intended to aid the learning of sports and movement activities, such as swinging a golf club correctly, or performing yoga, pilates or gym movements. Alternatively, it can be used in other applications, for example, learning to correct body image perception or body posture or movement.

Figure 9:
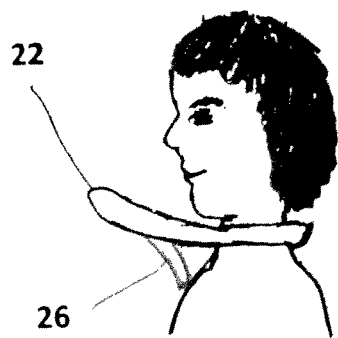
Figure 10:
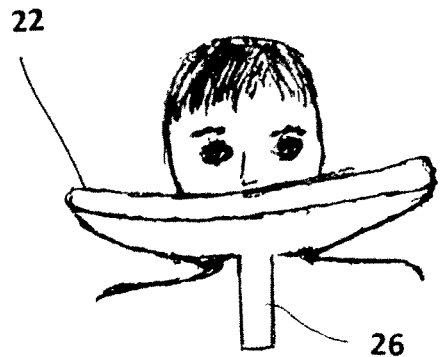
Figure 11:
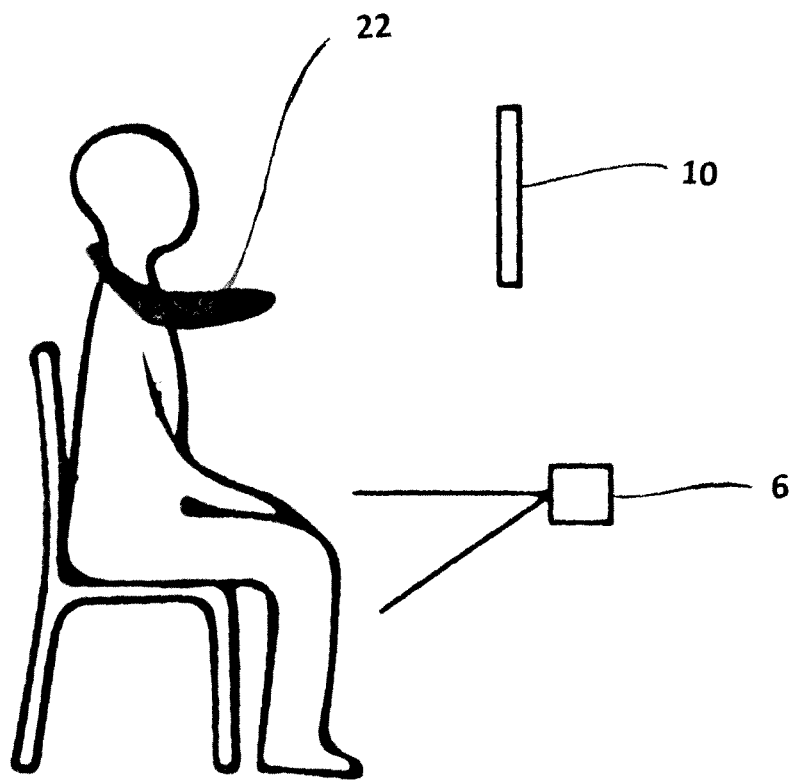

In this embodiment, the cover or shield is in the form of a collar 22 worn by the student in the neck area and shaped and dimensioned to conceal the student's body below the collar from the student's direct view. The collar 21 is preferably made from a self-supporting material so that it only shields the student's body from the student's own direct visual field. In this way, the concealed student's body and it's movements can still be captured by a video camera 6, and the captured images can be displayed on a computer screen 10 in the direct view of the student in the same way as the previous embodiments. The collar is preferably made from a material which is flexible as well as self-supporting. The collar 22 may have means for supporting the collar so that the front portion of the collar extends outwardly generally perpendicular to the wearer's chest even when the wearer inclines their head. This enables the wearer's body to remain out of direct view regardless of the wearer's movements during wearing of the collar. The supporting means may be a supporting strut 26 formed integrally with the collar 22. The strut 26 extends from the front portion into neck aperture 27 and is flexed downwards to abut the wearer's chest when the collar is worn, as shown in FIGS. 9 and 10. Alternatively, the support means may be a suitable fixing to close the neck aperture at the nape of the wearer's neck and to keep the collar in a position generally perpendicular relative to the wearer's chest.

By using the collar 22, the breaking down of activities and learning components perfectly, with the use of real time visual feedback, can be applied to many physical activities.

Athletes have a tendency to rely on vision for the coordination of movement instead of experience of the movement. The use of the visual feedback apparatus prevents this from happening, and promotes experiencing the movement specifically.

Student (and coach where required) can work on one isolated component at a time taken from the overall movement, using the following steps:—

1. Focus on the movement slowly in isolation, with the student watching the real time video relay, with that part of the body having been removed from their direct visual field. The student can see and learn the movement required, repetitively practice it perfectly at lower and then higher speeds.
2. Once confident that the student can perfectly replicate the movement, the screen is withdrawn (or the student closes their eyes).
3. ovement is again practiced but without the screen.
4. Provided movement is being performed properly, the student can resume the whole activity—starting easily so that they can concentrate on getting the component that they were working on right, i.e. if the student was playing tennis, they would not resume practice with a full on challenging relay to practice the new skill.

The cover 1 or the shield 22 can be used in other applications in which the student is learning a particular manual activity, such as sewing, cake decorating, painting, etc. In those applications, the manual activity is carried out concealed from direct view of the student either in the cover or below the shield. The performance is captured by the camera and the images are displayed on the screen for the student to view. Forcing the student to view the activity on the screen and not directly by looking at their hand makes the activity more complicated and therefore requires the student to use a higher level of concentration than when viewing the activity directly. This teaches the student to improve their levels of concentration. Although the activity is displayed on the screen effectively in real time, the minute or very short delay caused by the electronic processing of the images through the camera to the screen, as opposed to viewing the activity directly, increases the degree of difficulty in performing the activity, thereby increasing the necessary level of concentration.

Figure 12:
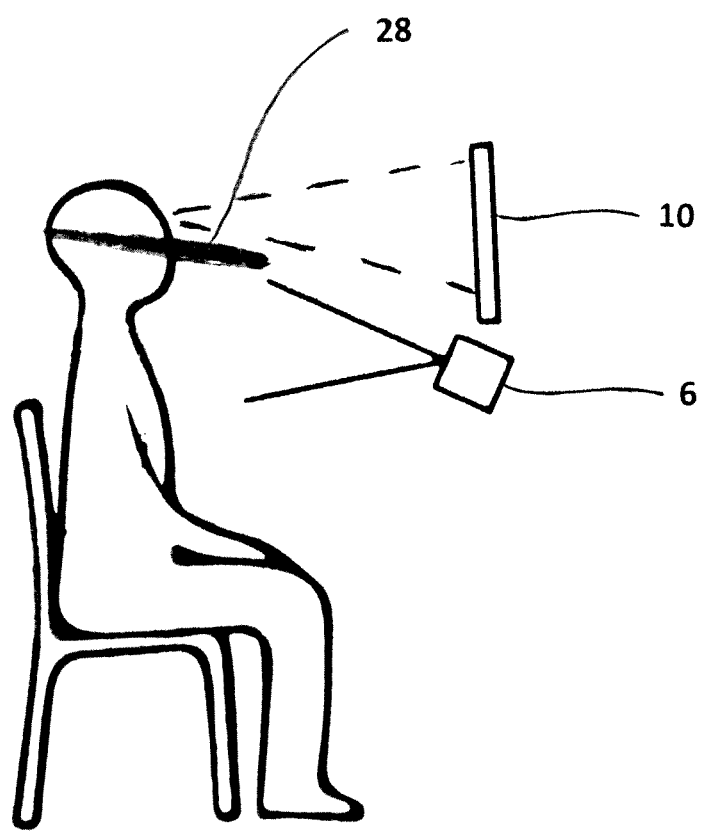
FIG. 12 shows a view of another embodiment intended to be used to learn a foreign language or used in speech therapy.

Another embodiment of a shield worn by a person is shown in FIG. 12. In this example, the shield 28 is worn between the person's eyes and mouth and a camera or webcam 6 is used to capture images of the concealed mouth below the shield and to display the images on a screen 10. This embodiment is particularly useful for the learning of a foreign language or use in speech therapy.

Learning languages is often challenging for many, and it is known that even for fluent bi/multi-lingual language speakers they will always be better in their 'mother' tongue than the secondary languages.

This embodiment uses real time video imagery of the student with video imagery of the teacher to enhance the learning process.

The apparatus is preferably used as follows:—
1. Teacher Video imagery—the mouth of a person for whom the language is their native language is shown speaking the words to be learnt—these could be single or multiple words or sentences. It is important that the speaker is native to the country of the language being learnt as their mouth movements will naturally create the sounds particular to that language.

Not all of the face is shown—only the lower half of the face—showing the whole face provides more information than is necessary, and would create an irrelevant mental distraction.
2. The student learning the language wears the shield 28 on their face. The webcam 6 is positioned to show only the lower part of the students face and the shield ensures that, even if they move, their whole face will never be visible on the screen 10. The viewing of the whole face would be too distracting as their natural tendency would be to self-critique what they look like as they speak. Furthermore, as the shield is limiting the users visual field, their mental capacity will be enhanced as the amount of visual information needing to be processed is reduced.

3. Words, pictures etc. may also be shown on the screen 10 to enhance the learning process—as per typical current language software programmes.
4. As the words to be learnt are announced (and displayed on the screen), they will be repeated (visually and verbally) giving the student the opportunity to match the visual movement and sounds of their mouth and voice to the visual movement and sounds of the teacher's mouth.

Thus, this embodiment makes use of the real time visual image of part of the face of the teacher with the simultaneous partial face image of the student coinciding with the audio pronouncement of the word or words, in order to learn a language, or assist in other speech therapy applications.

The shield is used to constantly restrict the amount of the wearer's face that is visible to them on the screen (seeing oneself facially often distracts the brain as many people focus on how they look, not how their face/mouth is moving). Wearing the shield removes any possibility of the wearer seeing their entire face. This removes any stress from the potential of seeing ones face, and negates the need of the wearer to 'try to ignore their face' both of which take up valuable mental capacity.

The apparatus according to the present invention could be used for learning skills other than those mentioned herein above. In particular, the apparatus of FIG. 2 could be used to learn the skill of playing a musical keyboard. This embodiment includes an elongated version of the open camera mount with a screen above, combined with computer software to teach piano. The student progresses to using the cover or collar to obscure their hands, as well as the musical keyboard, from their direct visual field.

The present invention advantageously facilitates the isolation of a particular activity of a skill and helps the student to memorize the learnt activity successfully. This is achieved by forcing the student to carry out the learnt activity in a more complex manner, whilst the actual difficulty of the activity remains unchanged. If the student struggles to achieve the movement when using the apparatus then the student is not ready—the repetition needs to be repeated. When the student uses the apparatus successfully without any negative impact on the movements required, they will subsequently find that when they return to carrying out the activity without the apparatus, the activity will feel easier than it was before they used the apparatus.

This secures the automaticity of the movement. The student memorizes the easier actions required, and the repetition becomes the prediction.

When we learn to move, we are learning a muscle motor movement skill, our brain is learning the movements required to perform the movement. Typically however, we rely on the visual input of what our eyes are seeing to dominate the learning process. For example athletes were found to overly rely on vision for the coordination of movement, instead of the experience of the movement.

In removing the body from the visual field of the student, the student will be able to fully focus on the feeling of the movement. If the body (or body part) is left within the direct visual field, then it is still within the 'mind's eye' and it cannot be ignored. Even if the user is trying to ignore that part, if it can still be seen, the brain will still expend some concentration on it, whether we want to or not. This spreads the focus too thinly, and overloads the brain. It is only by removing that part from the visual field, that it can really be ignored and the visual processing which normally pertains to that movement will not occur.

By illustrating the movements on the screen in real-time, the learning experience is strengthened—the student can feel the movement, and they can see the movement being performed on the screen. As the two activities are disconnected but experienced simultaneously, the visual processing does not override the movement processing; rather the two compound each other.

Additionally, the present invention could be used in other applications, such as to aid the correction of body movements or posture, for example in the field of physiotherapy or sports, or for correcting perception of body image. More specifically, the collar could be used to focus the wearer on an aspect of their movement or posture, or image of a part of their body.

The present invention can also be used when changing a mental perception, whenever that change in perception can be visually represented. For example, our ability to comprehend depth of perception matures within the brain sometime after approximately eight years of age. Before this time, we are less able to comprehend the depth and scale of 3D images. Taking this into account, the 2D image from the perspective of our eyes, is not how the image looks in 2D from another more appropriate angle. Misperceptions may have arisen from a younger age when the brain was too immature to comprehend the 3D depth of perception. Using the present invention the 'real' image can be illustrated and the misperception can be corrected.

For example, video footage could be obtained of the person before a coaching session using the present invention. This footage would then be shown to them, whilst wearing the shield or collar. The moment a user puts the shield on the amount of non-conscious visual information being processed is reduced. This enables more brain capacity to be used to process/take on the new visual image being seen.

Possible other applications of the present invention are:—
Building self-esteem/confidence
Improving perception of self, including body image, reduction of impact of personal dislikes e.g. loss of hair, facial distortion
Stress management (including exam stress) and including alleviating headaches caused by muscle tension.

Often it is difficult to image something which is unknown. Sometimes we imagine something that is incorrect.

The present invention can therefore also be used in conjunction with a third party coach to correct misperceptions of body image; for example in the treatment of anorexia nervosa.

This combination of the apparatus with a coach can also be used to learn movements and postures and how to maintain those movements/postures naturally and without causing incorrect tension in other muscles/parts of the body to compensate, such as in the treatment of scoliosis or other such diseases, or of alleviating pain and/or promoting healing of physical injuries.

Use of the shield thus restricts the visual field of the wearer. It removes enough information yet not too much, so it does not make the task of seeing any more complex, as can be the case when wearing video goggles.

The removal of non-relevant/misinformation from the visual field gives the wearer greater mental capacity to focus on the task at hand. Relevant information, which may be images of the person's thighs or back for example, is then displayed to the wearer. This may be via a live webcam feeding real time information to a screen viewed by the wearer. By concentrating on viewing the images on the screen of the relevant body part without being able to see other parts of their body, the wearer can learn to overcome mental and/or physical problems that they have concerning their body.

As an alternative to the camera and display screen, one or more suitably positioned mirrors could be used to display the required body part to the person. However, mirrors may be too 'typical', as the brain is too used to seeing reflections in mirrors and seeing it is too automatic. The screen makes this complex, because the brain is seeing an angle that it is not used to seeing, and it has to concentrate and focus to do it properly. Also, the electronic processing of the image when using a camera and screen causes a minute or very short time delay which is not present in the typical visual processing speed of a person, which adds to the complexity. In contrast, there is no such delay when mirrors are used.

The image displayed on the screen can be viewed as a true image or a mirror image by using known software to reverse the image. Whether a true or mirror image is used depends on the application of the apparatus. For instance, in the application of learning handwriting, the true image needs to be viewed, whereas in the application of learning sporting skills, such as a golf swing, a mirror image is needed. True or mirror images can also be obtained by the appropriate arrangement of mirrors, if this is used as an alternative to the camera and screen.

As an alternative to the collar, a shield positioned in the neck area of the wearer but supported from the wearer's head or ears may be used.

The main benefit of the present invention is that it simultaneously changes the typical neuroprocessing sequencing, the amount of visual information being streamed in to the brain for processing, in a manner which is familiar and minimises the learning load. This provides an opportunity for the brain to accurately understand the situation presented and to learn the neuroprocesses required to repeat with automaticity.

According to another aspect of the present invention, there is provided a method of learning core literacy skills with automaticity, in particular handwriting and reading skills involving the shape, formation, sound and name of characters of a language, such as letters of the alphabet and words, or other language characters, such as Chinese or Arabic characters. This method can be used in combination with the apparatus for learning handwriting, such as the arrangement shown in FIG. 1. The steps of the method of learning handwriting are set out below.

Step 1

Figure 13A:
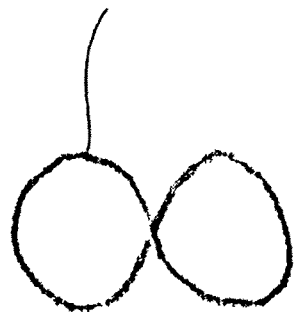
FIGS. 13a to 13c illustrate steps in a method of learning handwriting according to another aspect of the invention.

A symbol 23, such as an infinity symbol shown in FIG. 13a, which is not a language character, is repeatedly and continuously traced until the student can demonstrate a desired level of proficiency with consistent speed whilst maintaining accuracy.

Step 2.

The symbol 23 is traced as in step 1, whilst the student simultaneously performs a different task or action, preferably talking. The student continues for a sufficient length of time until a desired level of proficiency with consistent speed and accuracy for both activities is attained.

Step 3.

Figure 13B:
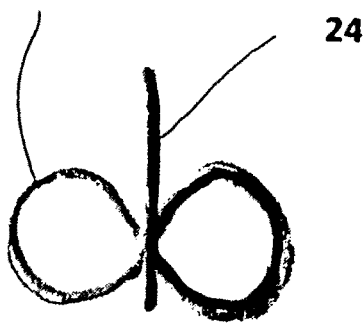

The symbol 23 with a language character 24 overlaid, as shown by the letter "b" in FIG. 13b, is used. The student traces only the language character 24 from its starting point to its end point, and then pauses. The student repeats this sequence until a desired level of consistent accuracy and speed is reached.

Step 4.

This is an optional step. The student carries out the actions in step 3 whilst simultaneously performing another task or action, preferably talking. This is repeated until the required level of proficiency in accuracy and speed is attained.

Step 5.

Using the symbol 23 overlaid by the character 24, step 1 is carried out immediately followed by step 3. This sequence includes a pause after tracing the character. The sequence is repeated until the required level of proficiency in speed and accuracy is reached, especially without any hesitation in transitioning from the character 24 to the symbol 23.

Step 6.

Using the symbol and character arrangement shown in FIG. 13b, the student carries out step 5 immediately followed by step 1 until the required level of proficiency in speed and accuracy is reached, again without hesitation moving from the character 24 to the symbol 23.

Step 7.

This step is carrying out step 6 whilst simultaneously performing another task or action, preferably talking, again until the required level of proficiency in speed and accuracy for both activities is reached.

Step 8.

This step involves tracing as in step 7, and also co-ordinating verbal announcement of the starting position of the character 24 with the hand/pencil position for the starting point of that character. This is repeated until the required level of proficiency in consistent speed and accuracy is maintained reached.

Step 9.

The symbol 23 alone, as shown in FIG. 13a, is used and the student writes, i.e. without tracing, the character 24 over the symbol, in the same position as is shown in FIG. 13b. Steps 6, 7 and 8 are repeated using writing without tracing of the character until the required consistent speed and accuracy are attained, so as to check the student's memory of the character and ability to reproduce the character unaided.

Step 10.

Figure 13C:
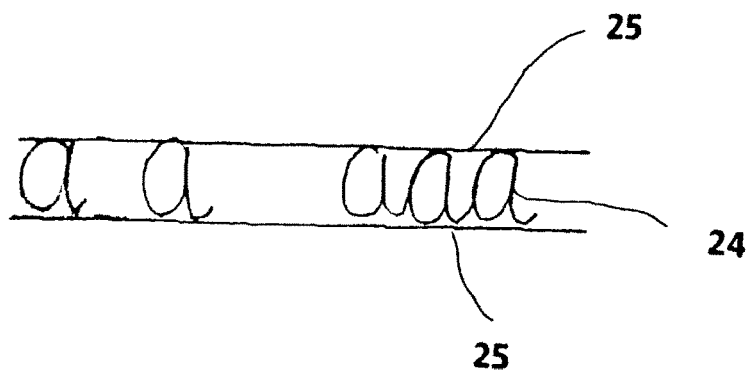

This step uses substantially parallel guide lines 25 as shown in FIG. 13c and the student writes the learnt character 24, within the guide lines. This is completed as soon as the character 24 can be successfully written.

After successfully writing one language character, the student can repeat steps 3 to 10 with one or more other language characters until, for example, the complete alphabet has been learnt. Combinations of characters, for example forming words, can be practiced using this method. This can be done by using the symbol 23 shown in FIG. 13a, and forming a sequence of inserting the symbol, inserting a first character, inserting the symbol, inserting a second character, inserting the symbol, inserting a third character, etc. Verbally announcing the start of each character is optional. The combination of characters used in this step can then be practiced on guide lines 25. At the beginning the symbol may also be presented with additional guide lines, which can be removed as the student's ability increases.

The order for learning letters can be varied according to the needs and knowledge of the student. The repetitive multi-tasking of verbalising the phonic letter sound or name and recalling and physically recreating the shape and formation of the character secures this information in the non-conscious part of the brain. This information will then be automatically retrieved when doing another task like reading or writing.

This method could also be used to aid the teaching of the character names/sounds. The continuous repetition and verbalisation of letter names, whilst physically tracing or writing the letter, increases the student's letter knowledge. Inserting a verbal "I am writing the letter 'a' and it makes the sound 'a'" would extend that letter learning. This method increases a student's ability to recall character name and/or sound by announcing the letter name and/or sound. Depending on the student's ability, it is likely that only the name or sound will be announced, but the step may be repeated to cover both letter name and letter sound separately.

If the method specifies the verbalisation string (e.g. "I am going to write the letter 'a'", then the method teaches handwriting as well as increasing letter awareness/knowledge.

Verbalising the appropriate letter names or letter sounds is required for the method to aid spelling knowledge.

The method then starts to use the phoneme knowledge and the letter name knowledge that a student requires to be able to write. Handwriting is not just the ability to accurately move the pencil, the phonic recall etc. is a component when the student writes.

The size of the symbol and characters are initially much larger than conventional size for handwriting. If the student is able, and they have learnt a few characters well, the size of symbol 23 can be made smaller, which results in the learning exercise taking less time.

The invention claimed is:

1. Apparatus for aiding learning by a person, said apparatus comprising a shield being arranged to conceal from the person a part of the body of the person, and a display assembly being arranged to visually display to the person during concealment of the concealed body part one or more images of a part of the body of the person not in direct view of the person, wherein the display assembly includes a camera operatively coupled to a display screen arranged within direct view of the person, and the shield is arranged to enable the camera to capture images of a body part not in direct view of the person and relay the captured images to the display screen to be viewed by the person, and wherein the shield arranged to be positioned around a neck area of the person and arranged to conceal from direct view of the person a part of the body of the person below the shield, the shield comprising a collar having a support arranged to support the collar so that a front portion of the collar extends outwardly generally perpendicular to a chest of the person even when a head of the person inclines.

2. Apparatus as claimed in claim 1, wherein the apparatus is intended to aid a person in the learning of a skill, the shield is arranged to conceal at least parts of the body of the person used to perform the skill, and the display assembly is arranged to display images of the concealed body parts in real time during performance of the skill by the person.

3. Apparatus as claimed in claim 2, including a monitor that monitors accuracy of the performance and arranged for transmitting to the person, verbally or otherwise, evaluative information relating to the accuracy.

4. Apparatus as claimed in claim 3, wherein the information is arranged to be transmitted to the person in real time during the performance.

5. Apparatus as claimed in claim 2, wherein the performance of the skill involves use of an implement by the person, the shield is arranged also to conceal the implement during its use, and the display screen is arranged also to display images of said implement in real time during said performance.

6. Apparatus as claimed in claim 1, wherein the shield positioned around the neck area comprises a collar made from a self-supporting material, whereby said part of the body of the person below the collar can remain out of direct view of the person regardless of the movements of the person during wearing of the collar.

7. Apparatus as claimed in claim 1, wherein the shield positioned around the neck area is arranged to be supported from the head or ears of the person.

8. A shield for aiding learning of a person and being arranged to be positioned around the neck area of the person, said shield being arranged so that, when worn by the person, the shield being arranged to shield at least part of the body of the person from a direct visual field of the person, said shield being intended to be used, when worn by the person, in combination with a camera being arranged to capture images of the body of the person below the shield and a display screen arranged within direct view of the person for displaying said captured images to the person, said shield comprising a collar having a support being arranged to support the collar so that a front portion of the collar extends outwardly generally perpendicular to a chest of the person even when a head of the person inclines.

9. A shield as claimed in claim 8, wherein the shield is arranged to be supported from the person's head or ears.

10. A shield for aiding learning of speech by a person, such as learning a foreign language or speech therapy, said shield being arranged to be worn between the eyes and mouth of the person, said shield being intended to be used, when worn by the person, in combination with a video camera and a display screen, the video camera and the shield being arranged so that the video camera can capture images of only the lower part of the face of the person, in particular the mouth of the person below the shield during performance of speech by the person, and the display screen being arranged within direct view of the person so that said captured images can be displayed in real time to said person.

11. Apparatus for aiding learning of speech by a person, such as learning a foreign language or for speech therapy, said apparatus comprising a shield that conceals from the person a part of the body of the person, and a display assembly that visually displays to the person during concealment of the concealed body part one or more images of a part of the body of the person not in direct view of the person, wherein the display assembly includes a camera operatively coupled to a display screen arranged within direct view of the person, and the shield is arranged to enable the camera to capture images of a body part not in direct view of the person and relay the captured images to the display screen to be viewed by the person, and wherein the shield is arranged to be worn between the eyes and mouth of the person with the display assembly being arranged to display images of only the lower part of the face of the person, in particular the mouth of the person, below the shield in real time to the person during performance of speech by the person.

* * * * *